United States Patent
Shan et al.

(10) Patent No.: US 12,184,133 B2
(45) Date of Patent: Dec. 31, 2024

(54) DEVICE FOR ADHERING MAGNETIC POLE SHOES ON ROTOR

(71) Applicant: HENGDIAN GROUP INNUOVO ELECTRIC CO., LTD., Dongyang (CN)

(72) Inventors: Kedi Shan, Dongyang (CN); Junjian Lu, Dongyang (CN); Caiping Xu, Dongyang (CN); Chenhui Jin, Dongyang (CN)

(73) Assignee: HENGDIAN GROUP INNUOVO ELECTRIC CO., LTD., Dongyang (CN)

(*) Notice: Subject to any disclaimer, the term of this patent is extended or adjusted under 35 U.S.C. 154(b) by 542 days.

(21) Appl. No.: 17/598,859

(22) PCT Filed: May 8, 2020

(86) PCT No.: PCT/CN2020/089103
§ 371 (c)(1),
(2) Date: Sep. 27, 2021

(87) PCT Pub. No.: WO2021/135024
PCT Pub. Date: Jul. 8, 2021

(65) Prior Publication Data
US 2022/0181955 A1     Jun. 9, 2022

(30) Foreign Application Priority Data

Dec. 31, 2019   (CN) .......................... 201911421132.0

(51) Int. Cl.
*H02K 15/03*     (2006.01)
*H02K 1/278*     (2022.01)

(52) U.S. Cl.
CPC .............. *H02K 15/03* (2013.01); *H02K 1/278* (2013.01)

(58) Field of Classification Search
CPC ............................. H02K 15/03; H02K 1/278
See application file for complete search history.

(56) References Cited

U.S. PATENT DOCUMENTS

| 5,051,852 A | 9/1991 | Kohno et al. |
| 5,367,215 A * | 11/1994 | Mason ................... H02K 16/02 |
| | | 310/91 |

(Continued)

FOREIGN PATENT DOCUMENTS

| CN | 104647012 A * | 5/2015 | ............ B25B 27/00 |
| CN | 204504716 U * | 7/2015 | |

(Continued)

*Primary Examiner* — Jeffrey T Carley
*Assistant Examiner* — Jose K Abraham
(74) *Attorney, Agent, or Firm* — Jiwen Chen; Joywin IP Law PLLC

(57) ABSTRACT

A device for adhering magnetic pole shoes on a rotor includes a soleplate, wherein a support seat is arranged on the soleplate; a magnet positioning seat is arranged above the support seat; the magnet positioning seat has a support frame, which includes an upper plate and a lower plate, with the lower plate having a first evading groove for evading a rotor core, and the upper plate having a second evading groove for evading an upper end of a rotor shaft; and fixation units and a plurality of positioning plates being provided between the upper and lower plates, each fixation unit including a push rod in sliding fit with the support frame and the push rod can move axially, a magnet positioning block being fixed at an inner end of the push rod, each positioning plate being located between two adjacent fixation units.

11 Claims, 4 Drawing Sheets

(56) References Cited

U.S. PATENT DOCUMENTS

| | | | | |
|---|---|---|---|---|
| 2005/0246886 A1* | 11/2005 | Morel | ................... | H02K 15/03 29/598 |
| 2012/0139396 A1 | 6/2012 | Yao | | |
| 2016/0049851 A1* | 2/2016 | Hasegawa | .............. | H02K 15/03 29/598 |
| 2016/0072370 A1* | 3/2016 | Hasegawa | .............. | H02K 15/03 29/598 |
| 2016/0111944 A1* | 4/2016 | Ohshima | ................ | H02K 15/03 29/598 |

FOREIGN PATENT DOCUMENTS

| | | | | | |
|---|---|---|---|---|---|
| CN | 105262258 | | 1/2016 | | |
| CN | 106253603 | | 12/2016 | | |
| CN | 106253603 | A * | 12/2016 | ............. | H02K 15/03 |
| CN | 106972711 | A * | 7/2017 | ............. | H02K 15/03 |
| CN | 207542960 | | 6/2018 | | |
| CN | 108462335 | A * | 8/2018 | | |
| CN | 108494191 | | 9/2018 | | |
| CN | 109167492 | | * 1/2019 | | |
| CN | 109167492 | A * | 1/2019 | ............. | H02K 15/03 |
| CN | 109249203 | | 1/2019 | | |
| KR | 20170003343 | | * 1/2017 | | |

\* cited by examiner

DEVICE FOR ADHERING MAGNETIC POLE SHOES ON ROTOR

This is a U.S. national stage application of PCT Application No. PCT/CN2020/089103 under 35 U.S.C. 371, filed May 8, 2020 in Chinese, claiming priority of Chinese Application No. 201911421132.0, filed Dec. 31, 2019, all of which is hereby incorporated by reference.

TECHNICAL FIELD OF THE INVENTION

The present invention relates to a device for adhering magnetic pole shoes on a rotor.

BACKGROUND OF THE INVENTION

As shown in FIG. 1, a rotor includes a rotor shaft 11 on which a three-section rotor core 12 is arranged. There is a certain included angle between the neighboring sections of the rotor core 12, and a plurality of positioning ribs arranged axially are provided on an outer circumferential wall of each section of the rotor core 12. The positioning ribs include lower positioning ribs 13 located on the outer circumferential wall of the lowermost section of the rotor core, middle positioning ribs 14 located on the outer circumferential wall of the middle section of the rotor core, and upper positioning ribs 15 located on the outer circumferential wall of the uppermost section of the rotor core. It is necessary to adhere one magnetic pole shoe 16 between every two positioning ribs. In order to facilitate the lamination and welding of rotor punching sheets to form a rotor core, positioning ribs are arranged on the outer circumferential edge of each rotor punching sheet, and laser welding is carried out recesses 17 on outer end faces of the positioning ribs of neighboring rotor punching sheets, so that the plurality of rotor punching sheets are manufactured into a rotor core 12.

Glue is applied to the outer circumferential wall of the rotor core between two adjacent positioning ribs, and then magnetic pole shoes are adhered on the rotor core at one end of the rotor. Then, the rotor is placed on a support seat that is opened upward, and the rotor is fitted with the support seat so that the lower end of the rotor shaft of the rotor is located in the support seat. The axial face of the rotor core adhered with the magnetic pole shoes is attached to the upper end face of the support seat, so that the magnetic pole shoes are limited between the positioning ribs on the middle section of the rotor core and the upper end face of the support seat. Subsequently, magnetic pole shoes will be adhered on the middle section of the rotor core and the upper section of the rotor core. The magnetic pole shoes on the middle section of the rotor core can be limited up and down by the positioning ribs on the upper and lower sections of the rotor core, respectively. However, as for the uppermost section of the rotor core, due to the influence from the magnetic pole shoes on the middle section of the rotor core, the magnetic pole shoes on the uppermost section of the rotor core will be deviated upward due to a repulsive force. Therefore, it is very troublesome to adhere magnetic pole shoes on the uppermost section.

SUMMARY OF THE INVENTION

An object of the present invention is to provide a device for adhering magnetic pole shoes on a rotor, which can improve the assembly accuracy of magnetic pole shoes.

In order to achieve the object, the present invention employs the following technical solutions. A device for adhering magnetic pole shoes on a rotor is provided, comprising a soleplate or a substrate plate, wherein a support seat for keeping the rotor arranged vertically is provided on the soleplate; a magnet positioning seat is arranged above the support seat; the magnet positioning has a support frame; the support frame includes an upper plate and a lower plate, with the lower plate having a first evading groove for evading a rotor core, and the upper plate having a second evading groove for evading an upper end of a rotor shaft; the support frame includes a upper plate and a lower plate, with a plurality of fixation units and a plurality of positioning plates being provided between the upper plate and the lower plate, each fixation unit including a push rod which is in sliding fit with the support frame so that the push rod can move axially, a magnet positioning block being fixed at an inner end of the push rod, an inner edge of the magnet positioning block being the same as an outer edge of a magnetic pole shoe in shape and size, each positioning plate being located between two adjacent fixation units, a recess (concave) and a bump (convex) matched with each other being respectively arranged on an inner end face of the positioning plate and an outer end face of a positioning rib of the rotor core, and the bump being able to enter the recess or escape from the recess; and, when the magnet positioning seat is fitted with the rotor core, an inner edge of the second evading groove on the upper plate is located on an inner side of an outer edge of the positioning rib of the rotor core.

The rotor is placed on the support seat, and magnetic pole shoes are adhered on the lower section of the rotor core and the middle section of the rotor core by a conventional method. When in use of the device of the present invention, glue is applied to the end face of the rotor core between positioning ribs, and the magnet positioning seat is placed on the rotor. The lower end face of the upper plate is supported on the upper end face of the uppermost rotor core, and the bump on the inner end face of the positioning plate is aligned with the recess on the outer end face of the rotor core, so that the magnet positioning block at the end of each push rod is located between two adjacent positioning ribs. Then, magnetic pole shoes are placed on inner sides of the magnet positioning blocks. Finally, the push rods are pushed, so that the magnetic pole shoes are allowed to move to the rotor core side and adhered on the end face of the rotor core between two adjacent positioning ribs. In the present invention, by limiting magnetic pole shoes by the upper plate of the magnet positioning seat, the magnetic pole shoes are prevented from moving up under the action of the magnetic pole shoes on the middle section of the rotor core, thereby realizing high-accuracy assembly of magnetic pole shoes.

Preferably, the support seat has a lower mating groove that is opened upward to evade the lower end of the rotor shaft; the plurality of fixation units on the support frame are annularly arranged at uniform intervals; a press is arranged above the support seat; a press block is rotatably fixed at a lower end of a press lifting rod of the press; and, the press block moves down under the action of the press so as to press on the magnet positioning seat.

When in use of the device of the present invention, after the magnetic pole shoe at one place is adhered and assembled, the rotor is rotated so that the surface of the rotor core without magnetic pole shoes assembled thereon is moved to the front of a worker, so that the worker does not need to move or lean to one side, and it is more convenient to use the device of the present invention.

Preferably, the support seat is fixed on a rotary mechanism, and the rotary mechanism is fixed on the soleplate, so that the support seat is rotatably fixed on the soleplate. With the above arrangement, the friction during rotation of the rotor is lower, so it is more convenient to use the device of the present invention. The rotary mechanism may be any existing device which can be electrically controlled and can realize the rotation of the support seat, for example, commercially-available indexing plates, rotary platforms or the like. With the above arrangement, it is more convenient to use the device of the present invention.

Preferably, the upper plate extends upward to form a top cover; the top cover has an upper mating groove running upward through the top cover to evade the upper end of the rotor shaft; and, when the magnet positioning seat is sheathed on the rotor, an upper end face of the top cover is located above an upper end face of the rotor shaft, and the press block moves down under the action of the press to come into contact with the upper end face of the top cover. With the above arrangement, the structure at the press block becomes simpler.

Preferably, a lower end of the press lifting rod is fixed to an inner ring of a bearing; the press block has an annular cross-section; an inner wall of the press block is fixed to an outer ring of the bearing; and, a lower end face of the press block is located below a lower end face of the bearing. With the above arrangement, it is easier to rotatably fix the press block, and it is convenient to manufacture and process the device of the present invention.

Preferably, the plurality of fixation units are annularly arranged in the support frame at uniform intervals; the plurality of positioning plates are annularly arranged in the support frame at uniform intervals; the magnet of each fixation unit is located between two adjacent positioning plates; and, the positioning plates are in one-to-one correspondence to the positioning ribs of the rotor core.

Preferably, upper ends of the positioning plates are fixed to the upper plate, while lower ends thereof are fixed to the lower plate; an annular plate extending upward is arranged on an outer circumferential edge of the upper plate; the push rods of the fixation units are slidingly fitted to the annular plate; and, an accommodating groove for accommodating magnetic pole shoes is formed between an inner circumferential edge of the annular plate and the outer circumferential edge of the upper plate. With the above arrangement, it is convenient to load magnetic pole shoes.

Preferably, push blocks are fixed at outer ends of the push rods, compression springs are arranged between the push blocks and the annular plate, and the compression springs are sheathed on the push rods. With the above arrangement, it is convenient to reset the push blocks.

Preferably, guide strips and guide slots matched with each other are arranged between the fixation units and the upper plate or the lower plate; the guide strips and the guide slots extend in a radial direction of the rotor core; the guide strips extending downward are provided on lower end faces of the magnet positioning blocks of the fixation units; and, an upper end face of the lower plate is recessed downward to form the guide slots. With the above arrangement, the magnet positioning blocks are prevented from deviating from the set positions, and the accuracy of adhesion and fixation of magnetic pole shoes is higher.

Preferably, a guide surface with a lower inner side and a higher outer side is formed on an outer edge of the lower end face of the upper plate; the guide surface is located on an outer circumferential side of the rotor core; the upper end faces of the magnet positioning blocks are slopes that are gradually elevated from inside to outside; and, the push rods drive the magnet positioning blocks to move to the rotor core side, so that the guide surface comes into contact with the upper end faces of the magnet positioning blocks. The slopes come into contact with the guide surface to press down the magnet positioning blocks, so that the magnetic pole shoes are prevented from deviating upward and the accuracy of adhesion and fixation of magnetic pole shoes is improved.

The present invention is more convenient to use and can improve the assembly accuracy of magnetic pole shoes.

DETAILED DESCRIPTION OF THE INVENTION

The present invention will be further described below by specific embodiments with reference to the accompanying drawings.

Figure 1:
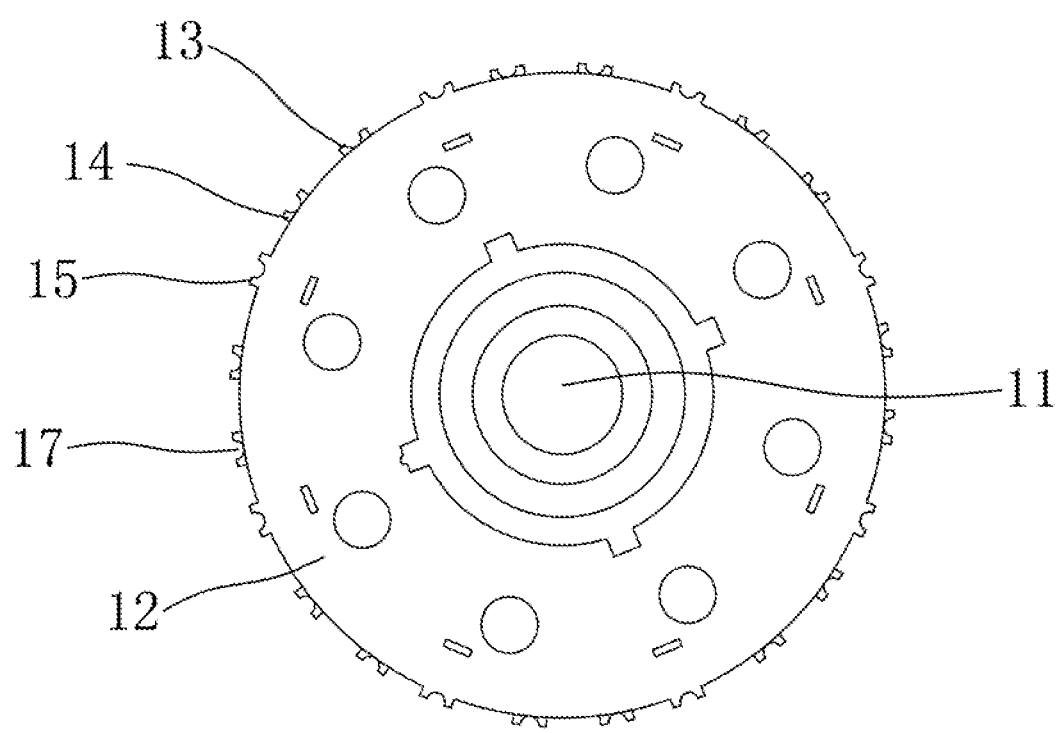
FIG. 1 is a top view of a rotor.
Figure 2:
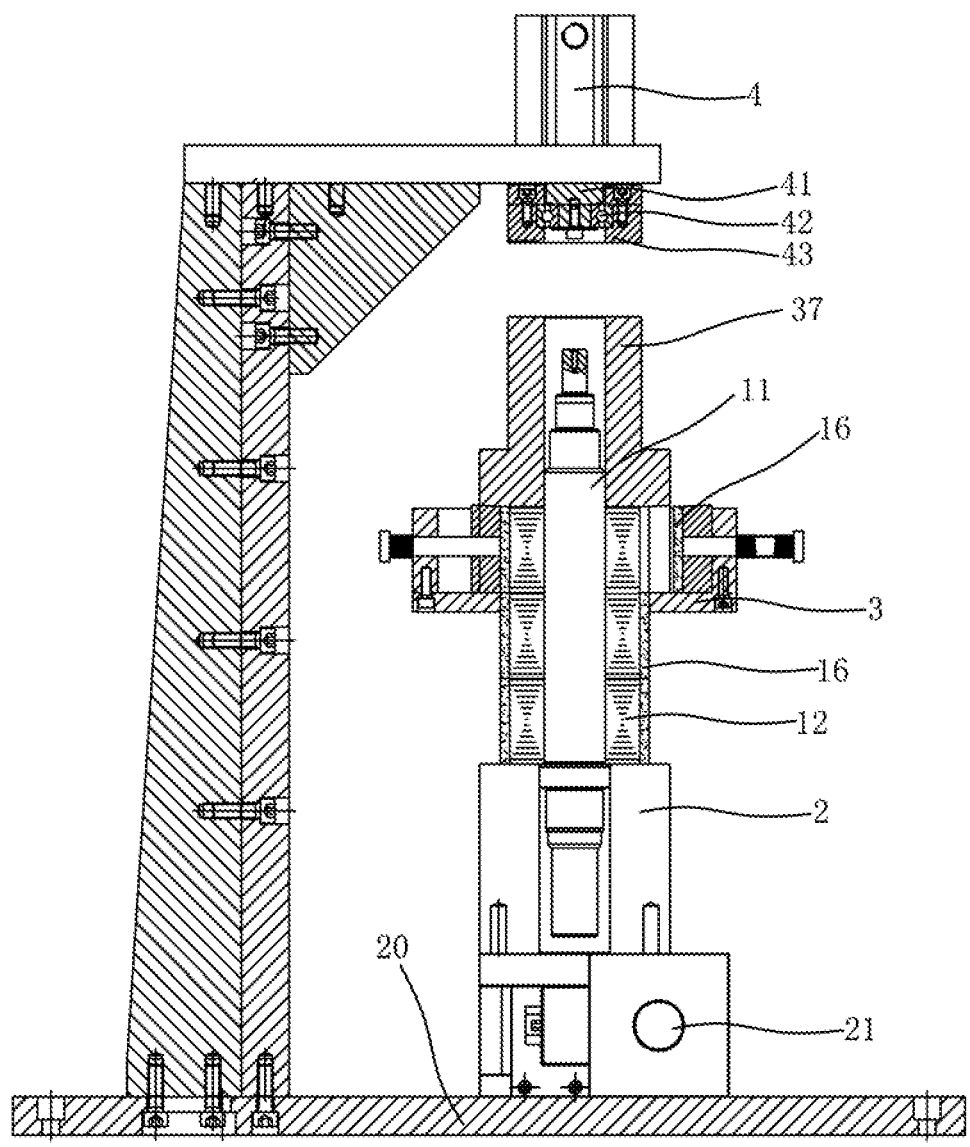
FIG. 2 is a schematic structure diagram of the device of the present invention when in use.
Figure 3:
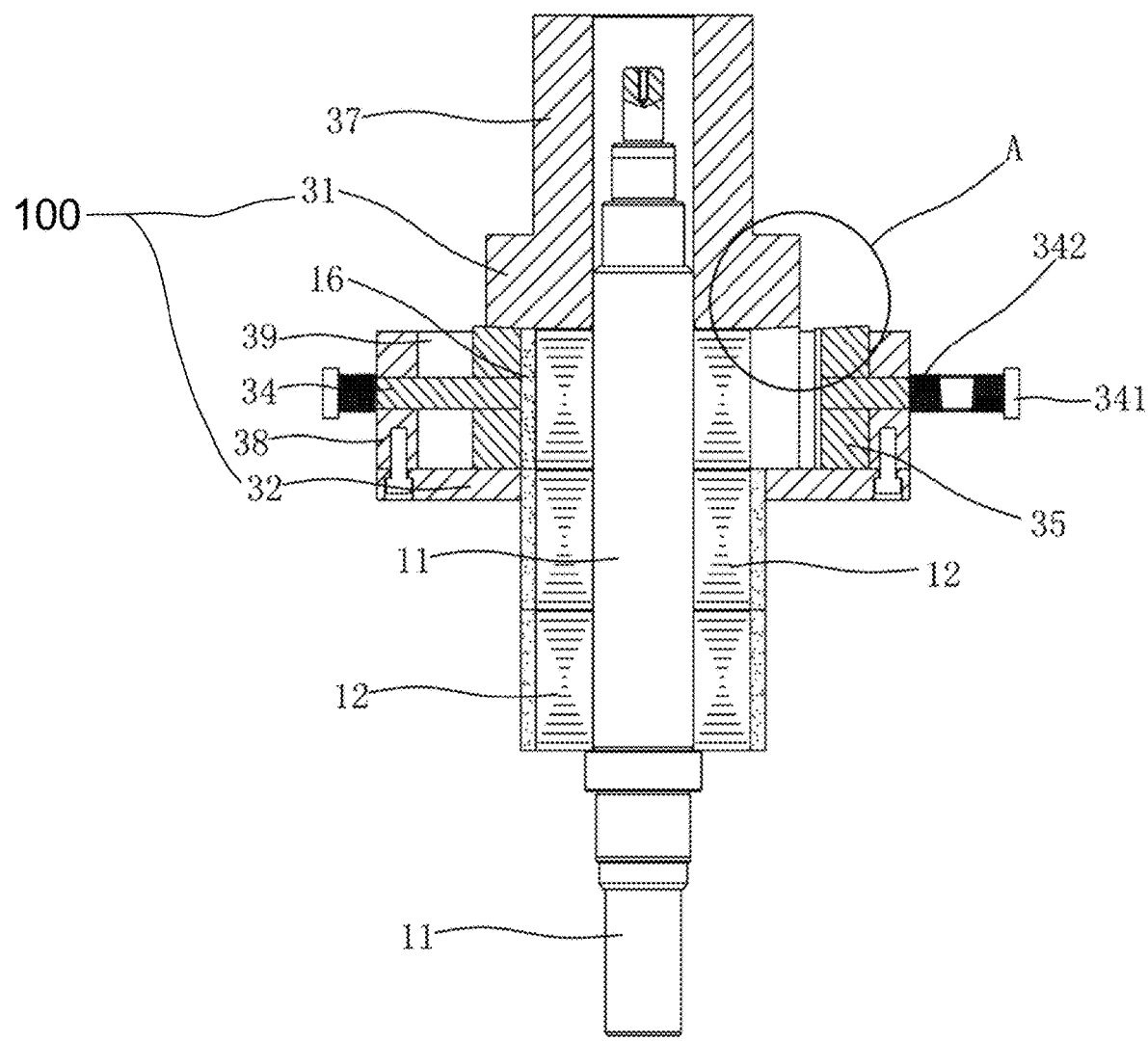
FIG. 3 is a schematic structure diagram when a magnet fixation seat is fitted with a rotor according to the present invention.
Figure 4:
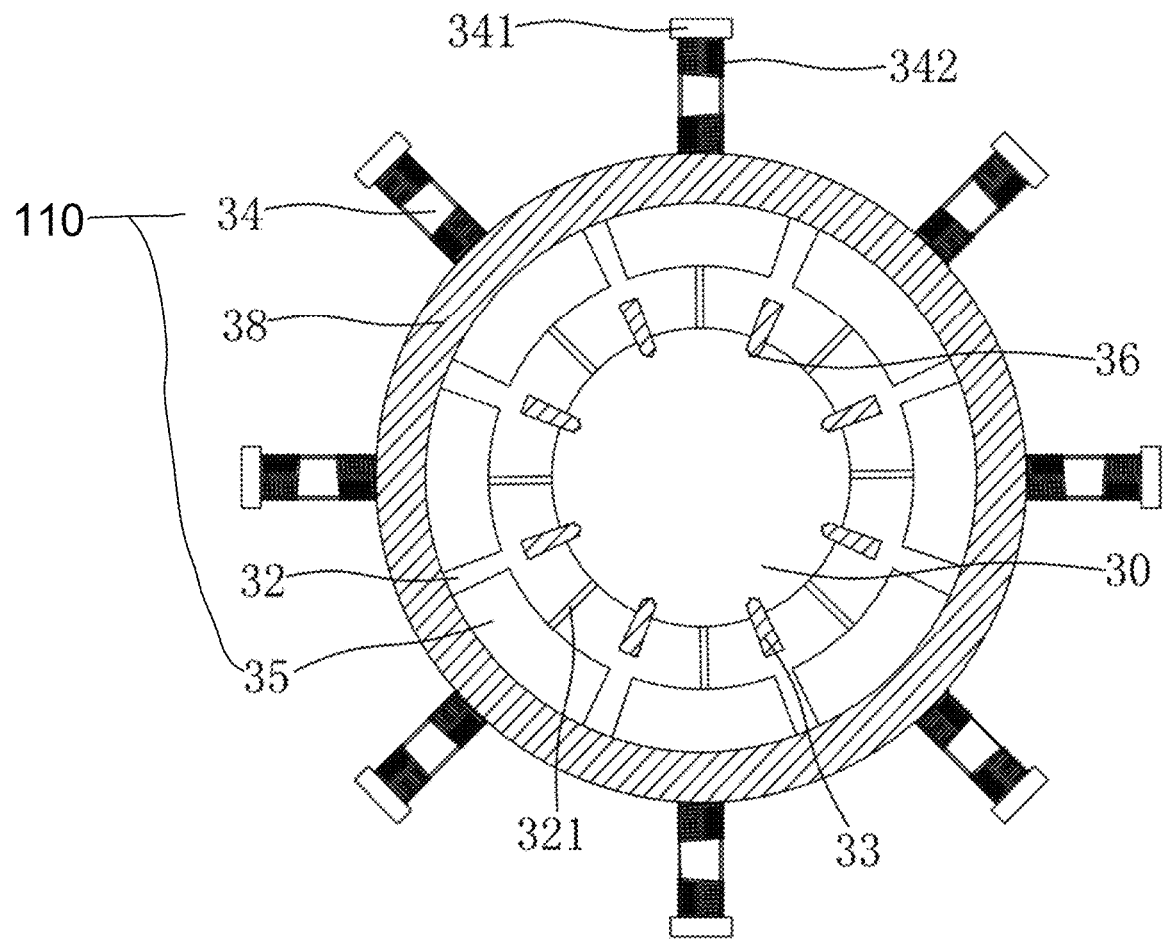
FIG. 4 is a sectional view of the magnet fixation seat according to the present invention.
Figure 5:
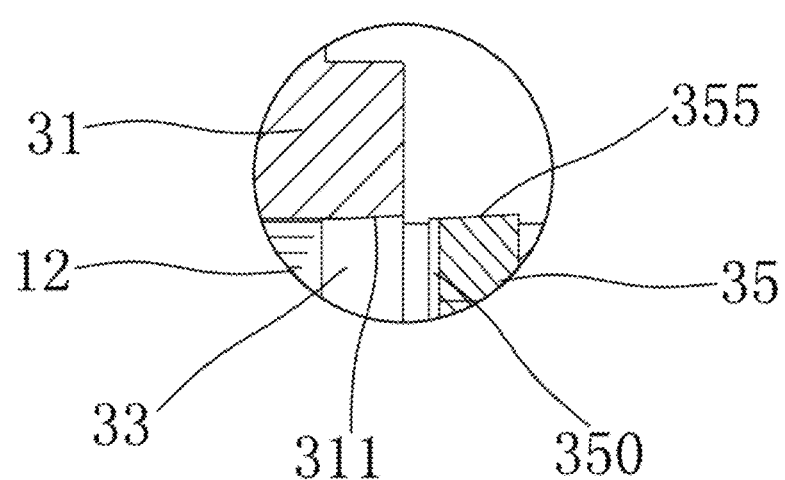
FIG. 5 is an enlarged view of part A in FIG. 3.

As shown in FIGS. 1-5, the present invention provides a device for adhering magnetic pole shoes on a rotor, including a soleplate 20. A support seat 1 for keeping a rotor shaft 11 arranged vertically to the soleplate is provided on the soleplate 20. A magnet positioning seat 3 is arranged above the support seat 2. A press 4 is fixed on the soleplate 20 by a bracket. The press 4 has a press lifting rod 41, and a lower end of the press lifting rod 41 is fixed to an inner ring of a bearing 42. A press block 43 has an annular cross-section. An inner wall of the press block 43 is fixed to an outer ring of the bearing 42, and a lower end face of the press block 43 is located below a lower end face of the bearing 42. The press block 3 is rotatably fixed at the lower end of the press lifting rod 41 by the bearing 42. The press 4 is an air cylinder.

The support seat 2 is fixed on a rotary mechanism 21, and the rotary mechanism 21 is fixed on the soleplate 10, so that the support seat 2 is rotatably fixed on the soleplate 20. The rotary mechanism 21 is a commercially-available rotary platform or indexing plate. The support seat 2 has a lower matching groove that is opened upward to evade the lower end of the rotor shaft 11.

The magnet positioning seat 3 has a support frame 100. The support frame 100 includes an upper plate 31 and a lower plate 32. The lower plate 32 has a first evading groove 30 for evading the rotor core 12, and the upper plate 31 has a second evading groove for evading the upper end of the rotor shaft 11. A plurality of fixation units 110 and a plurality of positioning plates 33 are arranged between the upper plate 31 and the lower plate 32. Each fixation unit 110 includes a push rod 34. The push rod 34 is in sliding fit with the support frame 100 so that the push rod 34 can move axially, and a magnet positioning block 35 is fixed at an inner end of the push rod 34. An inner edge of the magnet positioning block 35 is the same as an outer edge of a magnetic pole shoe 16 in shape and size, so that the inner end face of the magnet positioning block is of a cambered surface structure 350. Each positioning plate 35 is located between two adjacent fixation units 110. A bump 36 matched with a recess 17 on the outer end face of an upper positioning rib 15 of the rotor core is arranged on an inner end face of the positioning plate

35. The bump 36 is able to enter the recess 17 or escape from the recess 17. When the magnet positioning seat 3 is fitted with the rotor core 12, an inner edge of the second evading groove on the upper plate 31 is located on an inner side of an outer edge of the upper positioning rib 15 of the rotor core 12. The plurality of fixation units 110 are annularly arranged in the support frame 100 at uniform intervals, and the plurality of positioning plates 33 are annularly arranged in the support frame 100 at uniform intervals. The magnet positioning block 35 of each fixation unit 110 is located between two adjacent positioning plates 33. The positioning plates 33 are in one-to-one correspondence to the upper positioning ribs 15 of the rotor core 12.

The upper plate 31 extends upward to form a top cover 37. The top cover 37 has an upper mating groove running upward through the top cover 37 to evade the upper end of the rotor shaft 11. When the magnet positioning seat 35 is sheathed on the rotor, an upper end face of the top cover 36 is located above an upper end face of the rotor shaft 11, and the press block 43 moves down under the action of the press 4 to come into contact with the upper end face of the top cover 36. The top cover 36 has an inner diameter greater than that of the inner ring of the bearing 42.

Upper ends of the positioning plates 33 are fixed to the upper plate 31, while lower ends thereof are fixed to the lower plate 32. An annular plate 38 extending upward is arranged on an outer circumferential edge of the upper plate 31. The push rods 34 of the fixation units are slidingly fitted to the annular plate 38. An accommodating groove 39 for accommodating magnetic pole shoes 16 is formed between an inner circumferential edge of the annular plate 38 and the outer circumferential edge of the upper plate 31.

Push blocks 341 are fixed at outer ends of the push rods 34, compression springs 342 are arranged between the push blocks 341 and the annular plate 38, and the compression springs 342 are sheathed on the push rods 34. Guide strips and guide slots matched with each other are arranged between the fixation units and the upper plate or the lower plate, and the guide strips and the guide slots extend in a radial direction of the rotor core. The guide strips extending downward are provided on lower end faces of the magnet positioning blocks 35, and an upper end face of the lower plate 32 is recessed downward to form the guide slots 321. The guide strips and the guide slots 321 extend in the radial direction of the rotor core 12.

A guide surface 311 with a lower inner side and a higher outer side is formed on an outer edge of the lower end face of the upper plate 31. The guide surface 311 is located on an outer circumferential side of the rotor core 12. The upper end faces of the magnet positioning blocks 35 are slopes 355 that are gradually elevated from inside to outside. The push rods 34 drive the magnet positioning blocks 35 to move to the rotor core 12 side, so that the guide surface 311 comes into contact with the slopes 355 on the upper end faces of the magnet positioning blocks.

The rotor is placed on the support seat, glue is applied to the circumferential surfaces of the middle section of the rotor core and the lower section of the rotor core of the rotor, and magnetic pole shoes are successively adhered and fixed. The support seat is rotated, so that the surface of the rotor core without magnetic pole shoes fixed thereon are moved to the front of a worker or an operator.

After magnetic pole shoes are adhered and fixed on the middle section of the rotor core and the lower section of the rotor core, glue is applied to the circumferential surface of the upper section of the rotor core, and the magnet positioning seat is sheathed on the rotor. The upper plate of the magnet positioning seat is supported on the upper end face of the upper section of the rotor core, and the bump on the inner end face of the positioning plate is aligned with the recess on only the outer end face of the rotor core, so that the magnet positioning block at the end of each push rod is located between two adjacent positioning ribs. Then, magnetic pole shoes are placed on inner sides of the magnet positioning blocks, and the press is controlled to be activated to press the press block on the top cover. Finally, the worker pushes the push rods, so that the magnetic pole shoes are allowed to move to the upper section of the rotor core and adhered on the end face of the upper section of the rotor core between two adjacent positioning ribs. By controlling the rotate mechanism to rotate the support seat, magnet is successively adhered and fixed to the upper section of the rotor core.

The present invention is more convenient to use and can improve the assembly accuracy of magnetic pole shoes.

The invention claimed is:

1. A device for adhering magnetic pole shoes on a rotor, comprising a soleplate, wherein a support seat for keeping the rotor arranged vertically to the soleplate is provided on the soleplate; a magnet positioning seat is arranged above the support seat; the magnet positioning seat has a support frame; the support frame comprises an upper plate and a lower plate, with the lower plate having a first evading groove for evading a rotor core, and the upper plate having a second evading groove for evading an upper end of a rotor shaft; a plurality of fixation units and a plurality of positioning plates being provided between the upper plate and the lower plate, each fixation unit comprising a push rod which is in sliding fit with the support frame so that the push rod can move axially, a magnet positioning block being fixed at an inner end of the push rod, an inner edge of the magnet positioning block being the same as an outer edge of the magnetic pole shoe in shape and size, each positioning plate being located between two adjacent fixation units, a concave surface and a convex surface matched with each other being arranged on an inner end face of the positioning plate and an outer end face of a positioning rib of the rotor core; and, when the magnet positioning seat is fitted with the rotor core, an inner edge of the second evading groove on the upper plate is located on an inner side of an outer edge of the positioning rib of the rotor core.

2. The device for adhering magnetic pole shoes on a rotor according to claim 1, wherein the support seat has a lower mating groove that is opened upward to evade the lower end of the rotor shaft; the plurality of fixation units on the support frame are annularly arranged at uniform intervals; a press is arranged above the support seat; a press block is rotatably fixed at a lower end of a press lifting rod of the press; and, the press block moves down under the action of the press so as to press on the magnet positioning seat.

3. The device for adhering magnetic pole shoes on a rotor according to claim 2, wherein the support seat is fixed on a rotary mechanism, and the rotary mechanism is fixed on the soleplate, so that the support seat is rotatably fixed on the soleplate.

4. The device for adhering magnetic pole shoes on a rotor according to claim 2, wherein the upper plate extends upward to form a top cover; the top cover has an upper mating groove running upward through the top cover to evade the upper end of the rotor shaft; and, when the magnet positioning seat is sheathed on the rotor, an upper end face of the top cover is located above an upper end face of the rotor shaft, and the press block moves down under the action of the press to come into contact with the upper end face of the top cover.

5. The device for adhering magnetic pole shoes on a rotor according to claim 2, wherein a lower end of the press lifting rod is fixed to an inner ring of a bearing; the press block has an annular cross-section; an inner wall of the press block is fixed to an outer ring of the bearing; and, a lower end face of the press block is located below a lower end face of the bearing.

6. The device for adhering magnetic pole shoes on a rotor according to claim 2, wherein the plurality of positioning pates are annularly arranged in the support frame at uniform intervals; the magnet positioning block of each fixation unit is located between two adjacent positioning plates; and, the positioning plates are in one-to-one correspondence to the positioning ribs of the rotor core.

7. The device for adhering magnetic pole shoes on a rotor according to claim 1, wherein upper ends of the positioning plates are fixed to the upper plate, while lower ends thereof are fixed to the lower plate; an annular plate extending upward is arranged on an outer circumferential edge of the upper plate; the push rods of the fixation units are slidingly fitted to the annular plate; and, an annular accommodating groove for accommodating magnetic pole shoes is formed between an inner circumferential edge of the annular plate and the outer circumferential edge of the upper plate.

8. The device for adhering magnetic pole shoes on a rotor according to claim 7, wherein push blocks are fixed at outer ends of the push rods, compression springs are arranged between the push blocks and the annular plate, and the compression springs are sheathed on the push rods.

9. The device for adhering magnetic pole shoes on a rotor according to claim 1, wherein a tapered annular guide surface with a lower inner side and a higher outer side relative to the lower plate is formed on an outer edge of a lower end face of the upper plate facing the lower plate; the tapered annular guide surface is located on an outer circumferential side of the rotor core; the upper end faces of the magnet positioning blocks are slopes that are gradually elevated from inside to outside to match the tapered annular guide surface; and, when the push rods drive the magnet positioning blocks to move to the rotor core side, the tapered annular guide surface comes into contact with the upper end faces of the magnet positioning blocks.

10. The device for adhering magnetic pole shoes on a rotor according to claim 3, wherein a lower end of the press lifting rod is fixed to an inner ring of a bearing; the press block has an annular cross-section; an inner wall of the press block is fixed to an outer ring of the bearing; and, a lower end face of the press block is located below a lower end face of the bearing.

11. The device for adhering magnetic pole shoes on a rotor according to claim 4, wherein a lower end of the press lifting rod is fixed to an inner ring of a bearing; the press block has an annular cross-section; an inner wall of the press block is fixed to an outer ring of the bearing; and, a lower end face of the press block is located below a lower end face of the bearing.

* * * * *